United States Patent
Michiels et al.

(10) Patent No.: US 10,054,438 B2
(45) Date of Patent: Aug. 21, 2018

(54) METHOD AND SYSTEM FOR GEOMETRIC REFERENCING OF MULTI-SPECTRAL DATA

(71) Applicant: VITO NV, Mol (BE)

(72) Inventors: Bart Michiels, Oud-Turnhout (BE); Bavo Delaure, Kessel-Lo (BE); Stefan Livens, Schoten (BE)

(73) Assignee: VITO NV, Mol (BE)

(*) Notice: Subject to any disclaimer, the term of this patent is extended or adjusted under 35 U.S.C. 154(b) by 62 days.

(21) Appl. No.: 15/322,384

(22) PCT Filed: Jul. 7, 2015

(86) PCT No.: PCT/EP2015/065523
§ 371 (c)(1),
(2) Date: Dec. 27, 2016

(87) PCT Pub. No.: WO2016/005411
PCT Pub. Date: Jan. 14, 2016

(65) Prior Publication Data
US 2017/0138733 A1    May 18, 2017

Related U.S. Application Data

(60) Provisional application No. 62/021,292, filed on Jul. 7, 2014.

(30) Foreign Application Priority Data

Jul. 7, 2014   (GB) .................................. 1412061.2

(51) Int. Cl.
*G01C 11/02* (2006.01)
*G01J 3/28* (2006.01)
(Continued)

(52) U.S. Cl.
CPC .......... *G01C 11/025* (2013.01); *B64C 39/024* (2013.01); *B64D 47/08* (2013.01);
(Continued)

(58) Field of Classification Search
CPC ... G01C 11/025; G06K 9/0063; G01J 3/2823; G01J 2003/2826; H04N 5/332;
(Continued)

(56) References Cited

U.S. PATENT DOCUMENTS 6,211,906 B1    4/2001  Sun
6,831,688 B2 *  12/2004 Lareau ..................... G01J 3/02
                                                        348/272
(Continued)

FOREIGN PATENT DOCUMENTS

EP     2575367 A2     4/2013
WO     2011/073430 A1  6/2011

OTHER PUBLICATIONS

International Search Report (ISR) dated Oct. 26, 2015, for PCT/EP2015/065523.
(Continued)

*Primary Examiner* — Seung C Sohn
(74) *Attorney, Agent, or Firm* — Bacon & Thomas, PLLC

(57) ABSTRACT

A sensing device for obtaining geometric referenced multi-spectral image data of a RoI in relative movement with respect to the device, the sensing device having: a first and second 2D sensor element, the device obtaining subsequent multi-spectral images during the relative motion of the RoI thus providing distinct spectral information for parts of a RoI using the first element; and providing, using the second element, an image of the RoI for generating geometric referencing information to be coupled to the distinct spectral information; each element capturing a sequence of frames at a respective frame rate. The first frame rate is higher than the
(Continued)

second frame rate. The device generates intermediate geometric referencing information to be coupled to frames of the first sequence of frames for which no synchronous frame from the second sequence of frames is available, derived from temporally similar frames from the second sequence of frames.

8 Claims, 7 Drawing Sheets

(51) Int. Cl.
  *H04N 5/33* (2006.01)
  *H04N 7/18* (2006.01)
  *B64D 47/08* (2006.01)
  *B64C 39/02* (2006.01)

(52) U.S. Cl.
  CPC ............ *G01J 3/2823* (2013.01); *H04N 5/332* (2013.01); *H04N 7/183* (2013.01); *B64C 2201/127* (2013.01); *G01J 2003/2826* (2013.01)

(58) Field of Classification Search
  CPC ...... H04N 7/183; B64D 47/08; B64C 39/024; B64C 2201/127
  USPC ........................................ 250/208.1; 348/135
  See application file for complete search history.

(56) References Cited

U.S. PATENT DOCUMENTS 8,174,694 B2\* 5/2012 Bodkin .................... G01J 3/02
  356/328
2012/0257047 A1 10/2012 Biesemans et al.

OTHER PUBLICATIONS

Written Opinion dated Oct. 26, 2015, for PCT/EP2015/065523.
International Preliminary Report on Patentability (IPRP) dated Aug. 22, 2016, for PCT/EP2015/065523.
Second Written Opinion dated Jun. 6, 2016, for PCT/EP2015/065523.
British Search Report dated Jan. 7, 2015, for GB 1412061.2.
Chen et al., "Frame-Rate Up-Conversion Using Transmitted True Motion Vectors", IEEE Workshop on Multimedia Signal Processing, Los Angeles, CA, Dec. 7, 1998.
Luessi et al., "Efficient Motion Compensated Frame Rate Upconversion Using Multiple Interpolations and Median Filtering", Image Processing (ICIP), IEEE International Conference on Nov. 7, 2009.
Delaure et al., "The Geospectral Camera: A Compact and Geometrically Precise Hyperspectral and High Spatial Resolution Imager", International Archives of the Photogrammetry, Remote Sensing and Spatial Information Sciences, vol. XL-1/W1, ISPRS Hannover Workshop 2013, May 24, 2013.

\* cited by examiner

Fig. 3

| | | | | | |
|---|---|---|---|---|---|
| (x1,y1,λ1) | (x1,y2,λ1) | (x1,y3,λ1) | .... | .... | (x1,yn,λ1) |
| (x2,y1,λ2) | (x2,y2,λ2) | (x2,y3,λ2) | .... | .... | (x2,yn,λ2) |
| (x3,y1,λ3) | (x3,y2,λ3) | (x3,y3,λ3) | .... | .... | (x3,yn,λ3) |
| .... | .... | .... | .... | .... | .... |
| .... | .... | .... | .... | .... | .... |
| .... | .... | .... | .... | .... | .... |
| (xm,y1,λm) | (xm,y2,λm) | (xm,y3,λm) | .... | .... | (xm,yn,λm) |

~HI$_1$

| | | | | | |
|---|---|---|---|---|---|
| (x0,y1,λ1) | (x0,y2,λ1) | (x0,y3,λ1) | .... | .... | (x0,yn,λm) |
| (x1,y1,λ2) | (x1,y2,λ2) | (x1,y3,λ2) | .... | .... | (x1,yn,λm) |
| (x2,y1,λ3) | (x2,y2,λ3) | (x2,y3,λ3) | .... | .... | (x2,yn,λm) |
| .... | .... | .... | .... | .... | .... |
| .... | .... | .... | .... | .... | .... |
| .... | .... | .... | .... | .... | .... |
| (xm-1,y1,λm) | (xm-1,y2,λm) | (xm-1,y3,λm) | .... | .... | (xm-1,yn,λm) |

~HI$_2$

| | | | | | |
|---|---|---|---|---|---|
| (x0-1,y1,λ1) | (x0-1,y2,λ1) | (x0-1,y3,λ1) | .... | .... | (x0-1,yn,λm) |
| (x0,y1,λ2) | (x0,y2,λ2) | (x0,y3,λ2) | .... | .... | (x0,yn,λm) |
| (x1,y1,λ3) | (x1,y2,λ3) | (x1,y3,λ3) | .... | .... | (x1,yn,λm) |
| .... | .... | .... | .... | .... | .... |
| .... | .... | .... | .... | .... | .... |
| .... | .... | .... | .... | .... | .... |
| (xm-2,y1,λm) | (xm-2,y2,λm) | (xm-2,y3,λm) | .... | .... | (xm-2,yn,λm) |

~HI$_3$

......

| | | | | | |
|---|---|---|---|---|---|
| (x1-m,y1,λ1) | (x1-m,y2,λ1) | (x1-m,y3,λ1) | .... | .... | (x1-m,yn,λm) |
| (x2-m,y1,λ1) | (x2-m,y2,λ1) | (x2-m,y3,λ1) | .... | .... | (x2-m,yn,λm) |
| (x3-m,y1,λ2) | (x3-m,y2,λ2) | (x3-m,y3,λ2) | .... | .... | (x3-m,yn,λm) |
| .... | .... | .... | .... | .... | .... |
| .... | .... | .... | .... | .... | .... |
| .... | .... | .... | .... | .... | .... |
| (x1,y1,λm) | (x1,y2,λm) | (x1,y3,λm) | .... | .... | (x1,yn,λm) |

~HI$_m$

METHOD AND SYSTEM FOR GEOMETRIC REFERENCING OF MULTI-SPECTRAL DATA

FIELD OF THE INVENTION

The invention relates to the field of image capturing e.g. in aerial or industrial imaging. More particularly, the present invention relates to sensing systems for obtaining multi-spectral images, corresponding imaging systems and methods for using them.

BACKGROUND OF THE INVENTION

Hyperspectral imaging is a form of spectral imaging wherein information from across the electromagnetic spectrum is collected in many narrow spectral bands and processed. From the different spectral images that are collected, information of the objects that are imaged can be derived. For example, as certain objects leave unique spectral signatures in images which may even depend on the status of the object, information obtained by multi-spectral imaging can provide information regarding the presence and/or status of objects in a region that is imaged. After selection of a spectral range that will be imaged, as spectral images in this complete spectral range can be acquired, one does not need to have detailed prior knowledge of the objects, and post-processing may allow to obtain all available information. Whereas originally hyperspectral remote sensing was mainly used for mining and geology, other applications such as ecology, agriculture and surveillance also make use of the imaging technique.

Some agricultural and ecological applications are known wherein hyperspectral remote sensing is used, e.g. for monitoring the development and health of crops, grape variety detection, monitoring individual forest canopies, detection of the chemical composition of plants as well as early detection of disease outbreaks, monitoring of impact of pollution and other environmental factors, etc. are some of the agricultural applications of interest. Hyperspectral imaging also is used for studies of inland and coastal waters for detecting biophysical properties. In mineralogy, detection of valuable minerals such as gold or diamonds can be performed using hyperspectral sensing, but also detection of oil and gas leakage from pipelines and natural wells are envisaged. Detection of soil composition on earth or even at other planets, asteroids or comets also are possible applications of hyperspectral imaging. In surveillance, hyperspectral imaging can for example be performed for detection of living creatures.

In some applications, multi-spectral data can be obtained by collecting a full two dimensional image of a region in one spectral range of interest and by subsequently collecting other full two dimensional images of that region in other spectral ranges of interest whereby spectral filters are switched in between. This way of data collection nevertheless is not always possible, especially when the region of interest and the imaging system undergo a large relative movement with respect to each other.

In view of the relative movement, accurate determination of positional information is important for a correct interpretation of the collected different spectral data. Known systems make use of a global positioning system (GPS) and/or an inertial measurement unit (IMU).

International patent application publication WO 2011/073430 A1, in the name of the present applicant, discloses a sensing device for obtaining geometric referenced multi-spectral image data of a region of interest in relative movement with respect to the sensing device. The sensing device comprises a first two dimensional sensor element. The sensing device is adapted for obtaining subsequent multi-spectral images during said relative motion of the region of interest with respect to the sensing device thus providing spectrally distinct information for different parts of a region of interest using different parts of the first sensor. The sensing device also comprises a second two dimensional sensor element and is adapted for providing, using the second sensor element, an image of the region of interest for generating geometric referencing information to be coupled to the distinct spectral information.

The known sensor device acquires spectral data (with the first sensor element) and geometric data (with the second sensor element) at the same frame rate, e.g. 50 frames per second.

When the frame rate is further increased, the known sensor device generates a large amount of data which can be difficult to handle and the registration of the spectral data with the geometric data becomes computationally more demanding.

This disadvantage can render the known sensor device less suitable for applications which require a large number of spectral channels. Then a very high frame rate is required to ensure full spatial coverage in all the relevant bands of the spectrum.

SUMMARY OF THE INVENTION

It is an object of embodiments of the present invention to at least partially overcome disadvantages of the sensor device of the prior art.

More particularly, it is an object of embodiments of the present invention to provide a sensor device that can be efficiently used at increased frame rates of the spectral sensing element.

According to an aspect of the present invention, there is provided a sensing device for obtaining geometric referenced multi-spectral image data of a region of interest in relative movement with respect to the sensing device, the sensing device comprising: at least a first two dimensional sensor element, the sensing device being adapted for obtaining subsequent multi-spectral images during said relative motion of the region of interest with respect to the sensing device thus providing distinct spectral information for different parts of a region of interest using the first sensor element; a second two dimensional sensor element, the sensing device being adapted for providing, using the second sensor element, an image of the region of interest for generating geometric referencing information to be coupled to the distinct spectral information; the first two dimensional sensor element being operable to capture a first sequence of frames at a first frame rate and the second two dimensional sensor element being operable to capture a second sequence of frames at a second frame rate; wherein the first frame rate is higher than the second frame rate; and wherein the sensing device further comprises a processor configured to generate intermediate geometric referencing information to be coupled to frames of said first sequence of frames for which no synchronous frame from said second sequence of frames is available, said intermediate geometric referencing information being derived from one or more temporally similar frames from said second sequence of frames.

It is an advantage of the present invention that the second image sensor can be operated at a reduced frame rate, resulting in a less massive amount of data being generated. This architecture thus allows an increase in the frame rate of the spectral sensor, which in turn allows the use of a spectral sensor with more wavelength channels. In this way, a very efficient hyperspectral sensing device can be provided.

In an embodiment of the sensing device according to the present invention, said second frame rate is selected to ensure a predetermined amount of overlap between respective regions imaged by consecutive frames of said second sequence of frames.

It is an advantage of this embodiment, that the second frame rate can be adjusted to provide the necessary amount of overlap to allow proper geometric referencing, while the first frame rate can be set to the value required to provide full spatial coverage of all the relevant wavelength channels. The first frame rate may be such that an overlap of the image, e.g. with at least 10%, more advantageously with at least 25%, still more advantageously with at least 50% such as e.g. with 60% overlap with the previous image is established, such that information regarding the relative change in orientation of the instrument between subsequent images can be detected.

In an embodiment of the sensing device according to the present invention, a spectral filter and the first sensor element are arranged for obtaining spectral information at a first wavelength or wavelength range using a part of the first sensor element and for obtaining spectral information at a second wavelength or wavelength range using another part of the first sensor element.

This is a particularly advantageous manner of implementing the first sensor element in the system according to the present invention.

In an embodiment of the sensing device according to the present invention, the first sensor element and second sensor element are integrated on the same substrate.

It is an advantage of this embodiment that the spatial relationship between the first sensor element and the second sensor element is fixed, which facilitates the geo-referencing and removes the need for frequent recalibration of the sensing device. It is a further advantage of this embodiment that integration and fabrication on the same chip may result in similar thermal behavior of the at least two sensors, which may be of significant importance as for light weight UAVs, typically no compensation for thermal loads on the systems can be provided in view of weight. A similar thermal behavior of the sensors also may be advantageous in other applications, as no or little thermal load compensation is required.

According to an aspect of the present invention, there is provided an imaging system comprising the sensing device described above.

According to an aspect of the present invention, there is provided an aerial vehicle comprising the imaging system described above.

According to an aspect of the present invention, there is provided a method for obtaining geometric referenced multi-spectral image data of a region of interest in relative movement with respect to a sensing device, the sensing device comprising:—obtaining subsequent multi-spectral images during said relative motion of the region of interest with respect to the sensing device thus providing distinct spectral information for different parts of a region of interest using the first sensor element; providing, using the second sensor element, an image of the region of interest for generating geometric referencing information to be coupled to the distinct spectral information; the first two dimensional sensor element capturing a first sequence of frames at a first frame rate and the second two dimensional sensor element capturing a second sequence of frames at a second frame rate; wherein the first frame rate is higher than the second frame rate; and wherein the method further comprises generating intermediate geometric referencing information to be coupled to frames of said first sequence of frames for which no synchronous frame from said second sequence of frames is available, said intermediate geometric referencing information being derived from one or more temporally adjacent frames from said second sequence of frames.

According to an aspect of the present invention, there is provided a computer program product comprising code means configured to cause a processor to carry out the method described above.

The technical effects and advantages of embodiments of the imaging system, the aerial vehicle, the method, and the computer program product according to the invention correspond, mutatis mutandis, to those of the corresponding embodiments of the sensing device according to the present invention.

BRIEF DESCRIPTION OF THE FIGURES

These and other technical aspects and advantages of embodiments of the present invention will now be described in more detail with reference to the accompanying drawings, in which:

FIG. 3 illustrates a number of hyperspectral images as can be used in a system according to an embodiment of the present invention;

Figure 1:
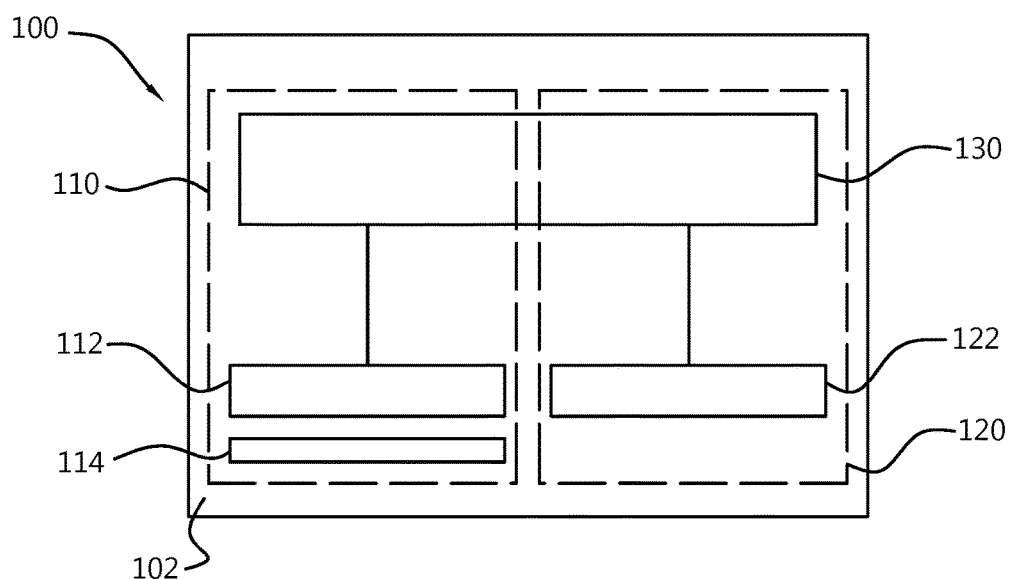
FIG. 1 shows a schematic overview of a sensing device for obtaining geo-referenced multi-spectral data as may be used in an embodiment of the present invention.

In the different drawings, where applicable, the same reference signs refer to the same or analogous elements.

DETAILED DESCRIPTION OF THE INVENTION

For illustrative purposes, the invention will be described with reference to the sensing device of the aforementioned international patent application publication WO 2011/073430 A1, but this is done without loss of generality. The characterizing features of the present invention can be combined with features of various embodiments of the known sensing device, as described in more detail in the following description. Details of the known sensing device are omitted where this is not necessary for the understanding of the present invention; the description of WO 2011/073430 A1 is hereby incorporated by reference for the purpose of guiding the implementation of corresponding embodiments of the present invention.

Where in the present invention reference is made to a two dimensional multi-spectral image, reference is made to an m×n pixelated image comprising information regarding one part of a region of interest imaged at one wavelength or spectral region and comprising information regarding at least another part of a region of interest imaged at a different wavelength or spectral region. Whereas the obtained spectral information within one spectral region may be a line, group or sub-matrix of pixels, the overall underlying pixelated sensor typically is a two dimensional spectral sensor. Embodiments according to the present invention may be applicable in a broad spectral range of electromagnetic radiation. Particular ranges that may be covered are visual and near IR (VNIR), typically considered to be in the range 400 nm to 1000 nm), short wave infrared, thermal infrared, etc., embodiments of the present invention not being limited to the exemplary ranges given. Where in embodiments of the present invention reference is made to a multi-spectral image or multi-spectral image data, reference is made to data comprising separate information regarding a region of interest for at least two different wavelengths or wavelength regions. Hyperspectral images or image data refer to data comprising separate information for a large number of wavelength or wavelength regions. Unless otherwise noted, references to multi-spectral images include hyperspectral images.

Where in embodiments according to the present invention reference is made to geo-referencing or geometric referencing of a point or object in the region of interest, reference is made to the existence of the point or object in a region of interest in physical space. It refers to establishing the location in terms of map projections or coordinate systems. The latter may for example include positional information, e.g. relative positional information. Such positional information may be (x,y) related positional information, but also z-related positional information such as height or relative height. It is not only applicable to aerial photography, aerial imaging or satellite imaging, where it is often referred to as geo referencing, but also in other applications, such as for example in industrial inspection.

In a first aspect, the present invention relates to a sensing device for obtaining geometric referenced multi-spectral image data. The sensing device may especially be suitable for hyperspectral imaging, although embodiments of the present invention are not limited thereto. The sensing device according to embodiments of the present invention are especially suitable for obtaining geometric referenced multi-spectral image data, using a sensing device and a region of interest in relative movement with respect to each other, which is for example the case when imaging from air is performed or when imaging using a top view is performed. The sensing device according to embodiments of the present invention comprises a single substrate, e.g. a single chip. The substrate may be any type of substrate, such as for example a glass substrate, a polymer substrate, a semiconductor substrate, etc. In some advantageous embodiments, the substrate may be a semiconductor chip, providing the possibility of using semiconductor processing steps for integration of the sensor elements. The single chip comprises at least a first two dimensional sensor element, whereby the sensing device is adapted for providing spectrally different information for different parts of a region of interest using the first two dimensional sensor element. The single chip also comprises a second two dimensional sensor element, whereby the sensing device is adapted for providing geometric referencing information of the region of interest using the second sensor element. The geometric referencing information advantageously may be coupled to the spectral information obtained by the sensing device. It is an advantage of embodiments according to the present invention that at least one first and second sensor element are processed on the same chip. The latter allows for accurate alignment of the sensor elements, such that little or no subsequent alignment for positioning the sensor elements with respect to each other is required.

By way of illustration, the present invention not being limited thereto, an exemplary sensing device as well as an imaging system comprising such a sensing device will be further discussed with reference to FIG. 1 to FIG. 3, embodiments of the present invention not being limited thereto.

Figure 2:
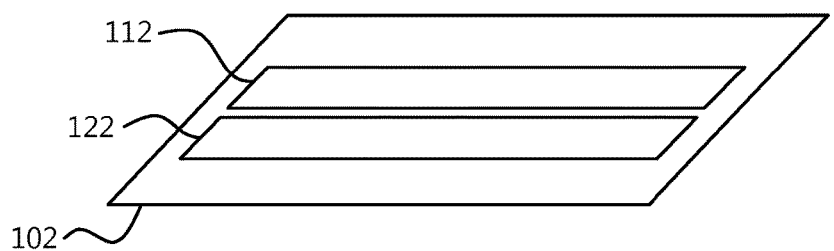
FIG. 2 shows a schematic illustration of the lay-out of sensor elements on the sensing device for obtaining geo-referenced multi-spectral data, as disclosed in WO 2011/073430 A1, which can be improved according to the present invention.

In FIG. 1, a sensing device 100 according to an embodiment of the present invention is shown, wherein the sensing device 100 comprises at least one first sensor element 112 and a second sensor element 122 processed on the same chip, i.e. processed on the same substrate 102. The first sensor element 112 and second sensor element 122 and optional further sensor elements thus may be homogeneously or heterogeneously processed sensor elements, processed on the same substrate 102. Advantageously, the sensor elements are homogeneously processed sensor elements 112, 122 on the same substrate 102. The sensor elements 112, 122 may be integrated on the same substrate 102 whereby the different layers constituting the different sensor elements are processed for both sensor elements 112, 122 using the same processing technology, for example—but not limited to—CMOS processing technology. The sensor elements typically may comprise a plurality of pixels. The pixels typically may be arranged in a matrix form in a number of columns and rows, although the invention is not limited thereto. The sensor elements may be referred to as frame sensor elements, as the sensor elements are two dimensional sensor elements, comprising e.g. a matrix of sensor pixels m×n. The two sensor elements may be selected so that at least one of the number of pixels in a row or the number of pixels in a column is the same for both sensors. In an advantageous embodiment, the sensor elements may comprise a high number of pixels in one direction for imaging simultaneously a relatively wide region of interest with a relatively high spatial resolution. If for example the sensing device is used for detecting or monitoring a region of interest using an UAV, a preferred scanning width may be at least 1000 m, more advantageously at least 2000 m, still more advantageously at least 3000 m. Taking into account a preferred ground resolution of at least 1 m, more advantageously at least 50 cm, still more advantageously at least 30 cm, the number of pixels in one direction may in some examples be at least 1000, in other examples at least 4000, in still other examples 10000. By way of illustration, embodiments of the present invention not being limited thereby, an example of a lay-out for the sensor elements 112, 122 on the substrate is shown in FIG. 2. The sensor elements 112, 122 advantageously are surface aligned. The distance between the two sensors may be smaller than 1 mm, although embodiments of the present invention are not limited thereby.

The sensing device 100 furthermore comprises drive and read-out circuitry for driving the sensor elements 112, 122. The drive and read-out circuitry 130 may be adapted for driving the sensor elements 112, 122 differently from each other. The drive and read-out circuitry 130 may be a drive and read-out circuit as known from prior art, whereby the drive and read-out circuitry 130 may comprise components such as amplifiers, switches, a buss, etc. In some embodiments, the pixel design, the column structure and the bus driver are laid out so that a multiplexer following the bus can be avoided, resulting in a better image quality. The drive and read-out circuitry also may be adapted for reading out the sensor elements 112,122. The read-out may be optimized for efficient and fast reading out. For example in a 10000×1200 sensor the frame rate at full resolution may be at least 35 frames per second, e.g. at least 50 frames per second. The driving and reading out also may be performed by different components, i.e. a separate drive circuitry and separate reading-out circuitry may be provided. The sensors may be equipped with shutters so that fast shutting, e.g. electronic shutting, can be obtained. The sensor elements as well as the driving and read-out circuitry may be processed on the same chip or die using semiconductor processing, such as for example CMOS technology, embodiments of the invention not being limited thereto.

According to embodiments of the present invention, the sensing device is adapted for providing different spectral information for different parts of a region of interest using the first two dimensional sensor element. The sensing device may thus be adapted for generating a multi-spectral image. In some embodiments, the sensing device may be adapted for generating hyperspectral data, i.e. in many narrow spectral bands. As the first sensor element according to embodiments of the present invention is a two-dimensional sensor element and as different spectral information is to be captured, typically part of the sensor element may be used for obtaining spectral information at a first wavelength or in a first wavelength region for one part of the region of interest, and at least one other part of the sensor element may be used for obtaining spectral information at least a second wavelength or in at least a second wavelength region for at least another part of the region of interest. In some embodiments, different lines of the sensor element may be used for gathering data at different spectral wavelengths or in different spectral wavelength regions. In other embodiments for example different blocks of the sensor element may be used for sensing different spectral data or different columns may be used for sensing different spectral data. In order to capture different spectral information, a multi-spectral filter 114, advantageously hyper spectral filter, may be present. The multi-spectral filter 114 forms together with the first sensor element 112 and the drive and read-out circuitry or part thereof for controlling the first sensor element 112, the first sensor. The multi-spectral filter may be directly applied to the first sensor element, e.g. mechanically behaving as a single element. Alternatively, the two components may be separate from each other, but configured or arranged so that appropriate filtering is obtained. By way of illustration, some examples of multi-spectral sensors are now discussed.

By way of illustration a set of hyperspectral data that can be obtained using a sensor according to an exemplary embodiment of the present invention is shown in FIG. 3. Whereas reference is made to hyperspectral data, the latter also applies to multispectral data. FIG. 3 illustrates a plurality of subsequent hyperspectral images recorded in m subsequent time spans, whereby the spectra are recorded for a relative movement between region of interest and sensing or imaging system corresponding with a total shift over a distance xm-x1 travelled during the total of the subsequent time spans.

FIG. 3 illustrates m hyperspectral images, each image consisting of m lines, wherein line $L_j$ comprises information of wavelength $\lambda_j$ or e.g. of spectral band $\lambda_j$-$\lambda_{j-1}$. The different images are recorded within m subsequent time frames. By way of illustration, the imaging of a physical position at coordinates $x_p$ and $y_q$ of the region of interest is indicated throughout the different hyperspectral images. It can for example be seen that in the information regarding the physical position at coordinate $x_1$ for different $y_q$ coordinates of the region of interest is in the first hyperspectral image $HI_1$ found in line 1, in the second hyperspectral image $HI_2$ found in line 2, in the third hyperspectral image $HI_3$ found in line 3, . . . and in the m'th hyperspectral image $HI_m$ found in line m. In each of these hyperspectral images this information is imaged for a different wavelength or wavelength region. Seen in an alternative way, information regarding the region of interest imaged at wavelength $\lambda_m$ or in a corresponding spectral band $\lambda_m$-$\lambda_{m-1}$, can be found by combining the information in line m of subsequent hyperspectral images as adjacent image lines, the ensemble over the m hyperspectral images forming an m×n image of the region of interest imaged at wavelength $\lambda_m$ or in a corresponding spectral band $\lambda_m$-$\lambda_{m-1}$. Similarly, the other lines of m subsequent hyperspectral images contain information regarding a region of interest at a different wavelength or in a different spectral band. The latter illustrates how hyperspectral images provide information regarding different spectral wavelengths or in different spectral bands and how subsequent hyperspectral images recorded during relative movement of region of interest and sensing system can provide an image of the full region of interest for different wavelengths or in different spectral bands. It is to be noticed, that whereas the principle is illustrated for subsequent lines covering different wavelengths, embodiments of the present invention are not limited thereto, and the variety of spectral information also may be obtained in other directions, e.g. varying spectral info for subsequent columns. Furthermore, whereas the principle is illustrated for a sensor wherein each line corresponds with a different wavelength or spectral region, embodiments of the present invention are not limited thereto and several lines of the spectral image may correspond with the same wavelength or spectral region. It is a characteristic of a spectral image that the image comprises information regarding at least two different wavelengths or spectral regions. Capturing of information using the principle as described above has the advantage that using a two dimensional sensor element, two dimensional images are recorded at different wavelengths or spectral regions, i.e. resulting in three dimensional information (two positional dimensions, one spectral dimension). In other words, in some embodiments according to the present invention, the sensor element for spectral data may be used as a set of line or block sensing sub-elements each sub-element recording positional information for a given wavelength or in a spectral region, whereby recording over time during relative movement of the region of interest with respect to the sensor element corresponds with scanning different positions of a region of interest. As described above, the sensing device 100 furthermore comprises a second two-dimensional sensor element 122 that forms, together with the driving and read-out circuitry or part thereof for driving the second two-dimensional sensor element 122 the second sensor 120. The second sensor 120 may be adapted for obtaining an image of the region of interest from which geo-referencing information can be obtained. The second sensor 120 may be adapted for providing a high resolution image, providing detailed geometric information, e.g. geographical information, regarding the region of interest. Images obtained via the second sensor 120 may allow to derive tie points in the imaged region of interest.

The frequency at which the images are captured with the second sensor may be such that an overlap of the image, e.g. with at least 10%, more advantageously with at least 25%, still more advantageously with at least 50% such as e.g. with 60% overlap with the previous image is established, such that information regarding the relative change in orientation of the instrument between subsequent images can be detected. The obtained information regarding rotation may be used as geometric referencing information, according to embodiments of the present invention, for coupling to the multi-spectral data obtained using the first sensor 110, so that geo-referenced multi-spectral data can be obtained.

Figure 5:
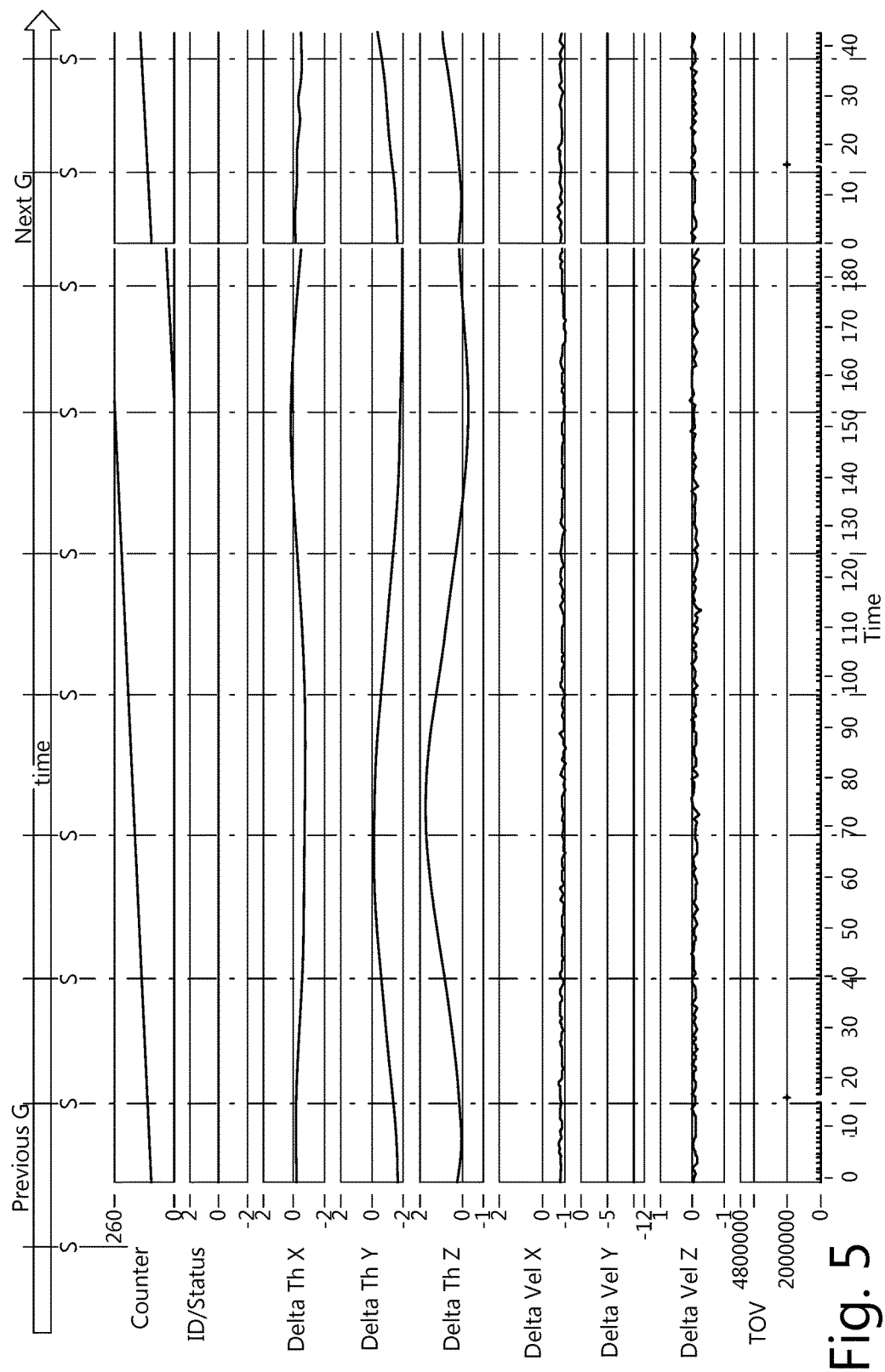
FIG. 5 represents a timing diagram of the capturing of spectral (S) and geometric (G) frames according to an embodiment of the present invention.

According to the invention, the frequency at which the images are captured with the second sensor is lower than that at which images are captured with the first sensor. Preferably, the image acquisition frequency of the second sensor is an integer fraction of the image acquisition frequency of the first sensor, such that images acquired with the first sensor periodically coincide in time with images acquired with the second sensor. For the images of the first sensor for which no synchronous image of the second sensor exists, interpolated geometric data has to be used. This interpolated geometric data is obtained from the second-sensor images that are closest in acquisition time to the targeted first-sensor image, preferably the second-sensor images immediately preceding and immediately following the targeted first-sensor image. Such a difference in image acquisition frequencies is schematically illustrated in FIG. 5.

In embodiments of the present invention, an interpolation algorithm is used which is specifically suited for platform attitude interpolation. The parameters to be interpolated include the various angles that describe the attitude of the sensing device. Accordingly, certain embodiments at least partially use interpolation of attitude data in angular coordinates.

In embodiments of the present invention, the interpolation algorithm uses first derivatives (angular and/or linear velocity) and second derivatives (angular and/or linear acceleration) to predict the attitude of the sensing device at moments between captured images, taking into account the laws of mechanics that govern the motion of the sensing device and the platform on which it is mounted (e.g., an aerial vehicle). These first and second derivatives may be obtained from an inertial measurement unit (including GPS, gyroscopes, accelerometers, etc.).

The purpose of the interpolation algorithm is to obtain accurate estimates on position and external orientation of the platform for every first sensor image (spectral image), on the basis of the (less frequently acquired) second sensor images. The inputs for this may be obtained from two independent sources:

Filtered GPS/IMU (short time intervals)
  Using GPS (for position) and IMU (for attitude): They provide "raw" measurement data at small time intervals. This data is typically noisy and individual measurements are not very accurate. It is customary to filter the data using "Kalman filtering" (which is the optimal filter for this type of data) to achieve smooth "most plausible" estimates at all points in time. This filtering is shown as "static correction" in the diagram of FIG. 7.
Image based (high accuracy)
  Using image data: (high quality, high spatial resolution second sensor images). Dedicated points in the images are matched using features (ground control points). This can yield very accurate estimates of position and attitude for the time points for which there is a G-frame available.

Figure 7:
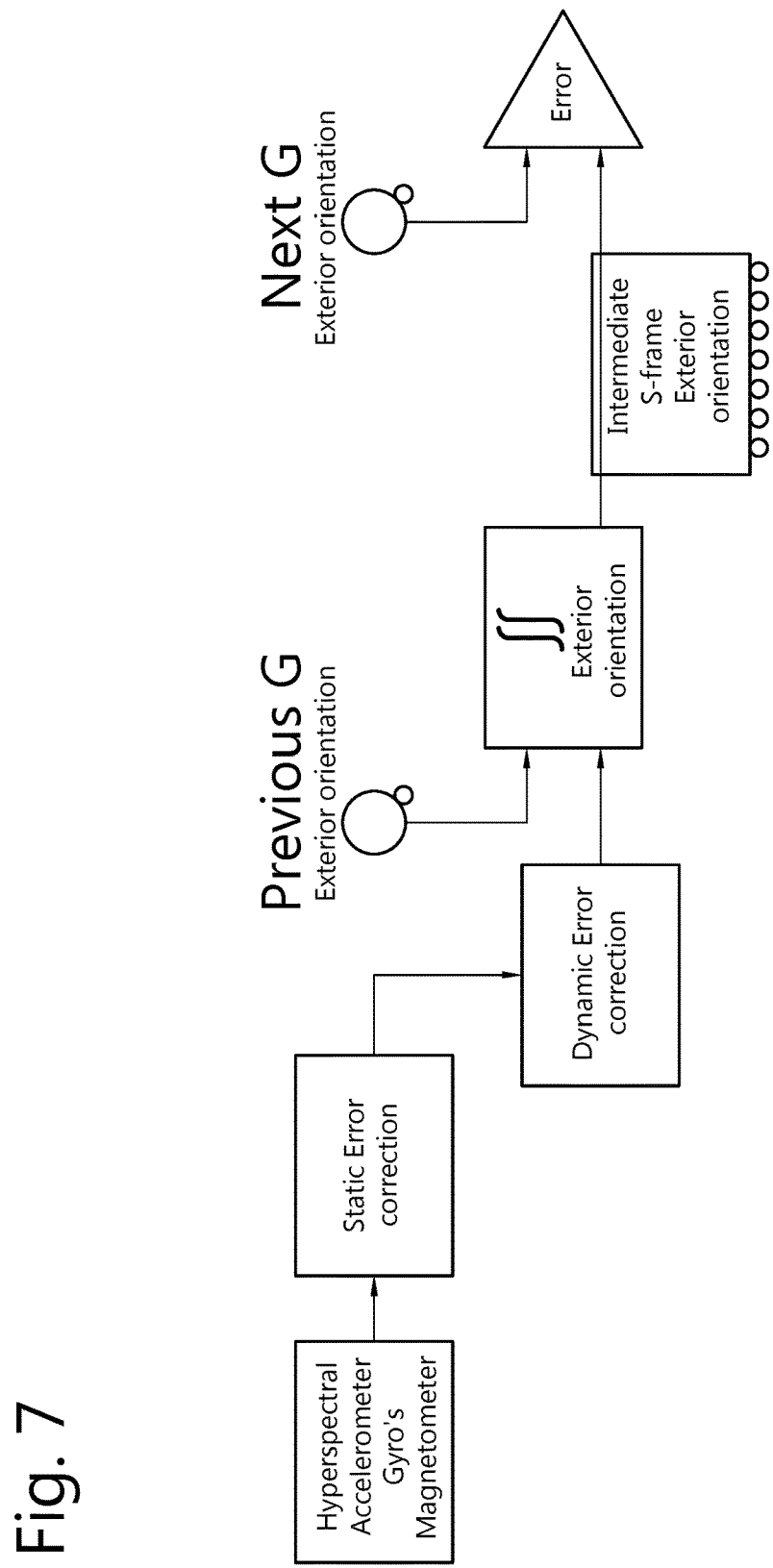
FIG. 7 represents a flow chart of an algorithm for use in an embodiment of the present invention.

Optimal results for all first sensor images (i.e., all time points) can be obtained by combining the two sources of information. We list three possible methods:

1. Correction: the filtered results are used, and every time an image based result is available, the filtered result is corrected to the image based value by applying a simple offset. This offset is kept constant for the next filtered results. When the next image based result is available the error with the obtained result is calculated. This is fed back in the loop to set the new offset. The process is depicted in FIG. 7.

Figure 8:
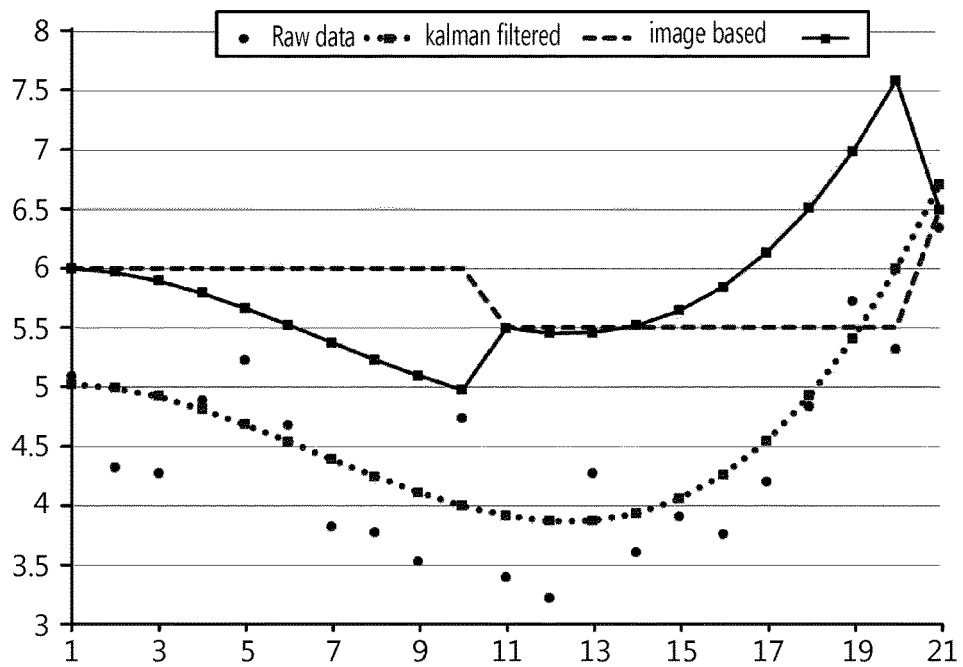
FIG. 8 provides a first graph illustrating filtering and interpolation algorithms used in embodiments of the present invention.

An example result for a single variable is shown in the graph presented in FIG. 8. The measured data are the dots, showing substantial noise between subsequent points. The bottom dotted curve represents the Kalman-filtered results. At point 1, 11 and 21, there is also an image based result. The offset is set at point 1 and applied up to point 10. At point 11 a new offset is calculated and applied until point 21. The results are shown in the solid curve. At point 11 and 21, new offsets are applied, which result in a sharp jumps in the curve.

2. Interpolation: Adjust the Filtered GPS/IMU result to the values of the image based result for the available time points. Instead of applying fixed offsets as in the previous method, the offsets are calculated at all points where possible, and interpolated for all points in between. A simple linear interpolation can be assumed.

Figure 9:
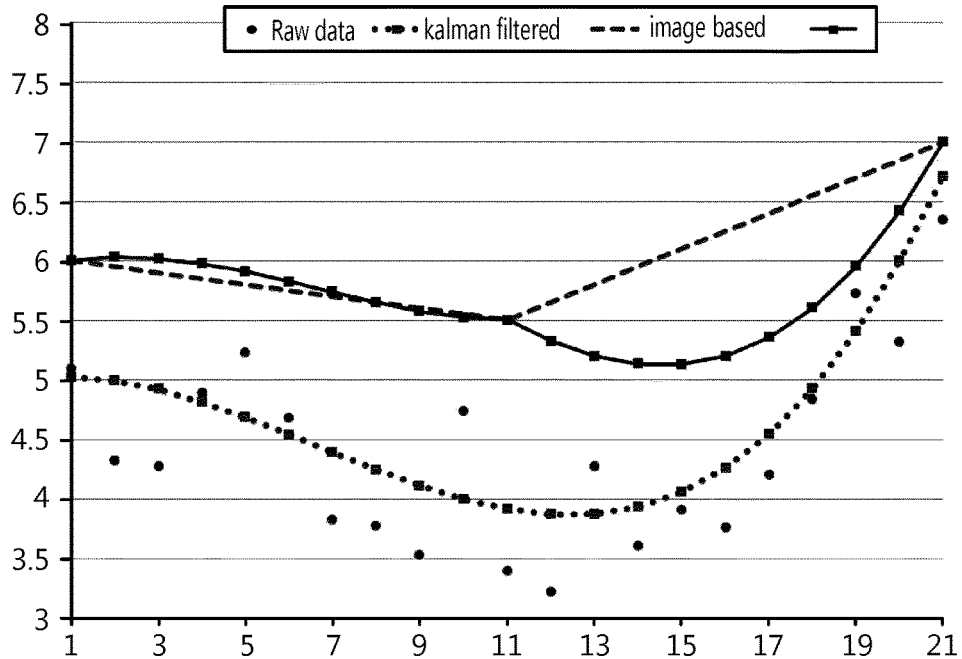
FIG. 9 provides a second graph illustrating filtering and interpolation algorithms used in embodiments of the present invention.

An example of this is shown in the graph presented in FIG. 9. The dashed curve now shows the linear interpolation between the offsets. In the final result the linear behavior of the filtered result is replaced by the interpolated image based result. It is shown in the solid line in the graph. This matches the image based points, and follows the filtered the shape of the filtered curve in between. The advantage is that jumps in the result are avoided. The disadvantage is that the intermediate results can only be calculated after the next image based result is available.

3. Add image based results to Kalman filtering: The image based results can be simply added to the set of GPS/IMU raw data. When proper weights are given to acknowledge the higher accuracy, the Kalman filtering will take this into account and use the information optimally. This leads in principle to superior results.

Figure 4:
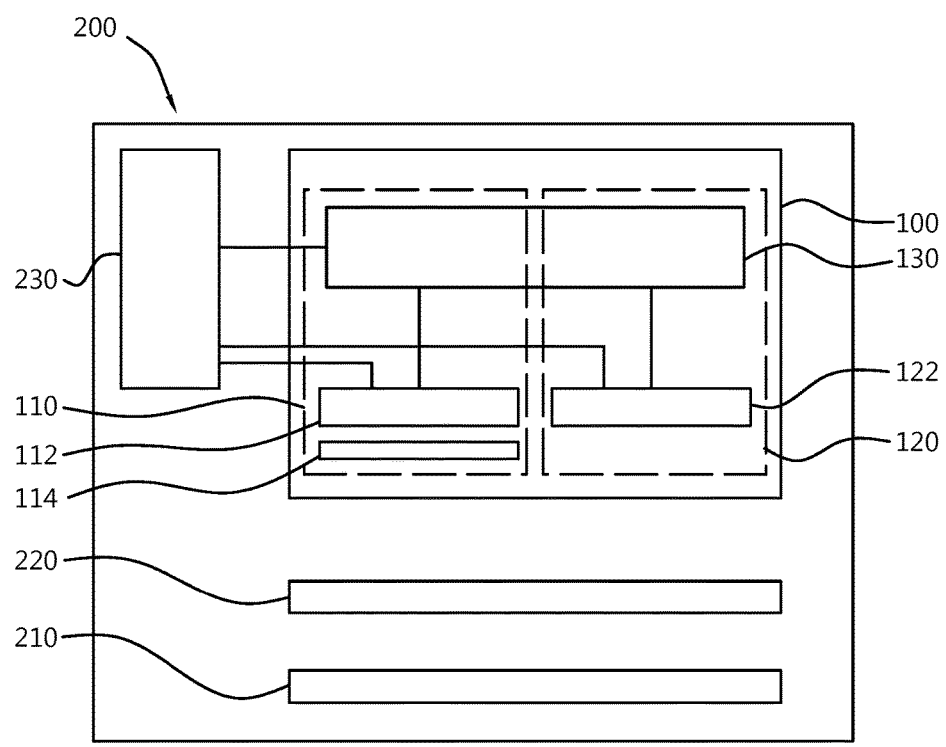
FIG. 4 shows an imaging system comprising a sensing device for obtaining geo-reference multi-spectral image data according to an embodiment of the present invention.

Embodiments of the present invention also relate to an imaging system. A schematic representation of an imaging system 200 comprising a sensing system according to embodiments of the present invention is shown in FIG. 4 by way of example. The imaging system 200 comprises a sensing device 100 as described for example above. The imaging system 200 furthermore comprises optical elements for guiding radiation to the two sensing elements of the sensing device 100. Such optical elements may for example comprise at least one lens 210 for capturing the radiation to be collected and focusing the radiation onto the sensor elements. In some embodiments, a single lens 210 may be used for collecting the radiation for both sensor elements, whereas in other embodiments different lenses may be used for the different sensor elements. In some embodiments according to the present invention, the collected radiation may be split to the two sensor elements using a radiation splitter, such as for example a beam splitter 220. Alternatively, or in addition thereto, the configuration of the sensor elements 112, 122 processed on the same substrate 102 may allow for taking into account positional information between the sensor elements when correlating the images obtained using the two sensor elements.

The imaging system furthermore may comprise an image processor 230 for correlating the images obtained with the first sensor 110 and the second sensor 120. The image processor may for example correlate geometric information, e.g. positional information, obtained with the second sensor 120 with spectral information obtained in different spectral channels in the first sensor 110, so that accurate hyperspectral information is obtained. Such image processing may be performed in a single processor or in a plurality of processors. The processing may be performed after the full set of images have been captured, although in some embodiments substantially direct processing may be performed, as soon as all information regarding the same region of interest is captured in both sensors 110, 120. A more detailed description of the image processing that may be performed by a processor 230 according to embodiments of the present invention will further be discussed later with reference to FIG. 6, illustrating standard and optional steps of an example of a method for sensing according to an embodiment of the present invention.

The imaging device furthermore may comprise a global positioning system for providing GPS data and/or an inertial measurement unit for providing inertial data regarding the imaging system. Such components may assist in providing approximate geo-referencing data, which may assist in deriving geo-referenced spectral-data based on the image obtained with the second sensor 120.

In one aspect, the present invention thus also relates to an imaging system as described above comprising a sensing device as described above. In another aspect the present invention also relates to an industrial system or unmanned aerial vehicle (UAV) comprising such an imaging system for monitoring, imaging or inspection. It thereby is an advantage of embodiments according to the present invention that the sensing device comprises the two sensing elements on the same sensor, such that thermal load due to temperature variation or such that environmental conditions have less influence on the obtained result. In still another aspect, the present invention relates to a method for obtaining image data regarding a region of interest. It thereby is an advantage of embodiments according to the present invention that multi-spectral data of a region of interest can be obtained with high geometric accuracy, e.g. geographic accuracy, e.g. a geometric accuracy that is significantly higher than can be obtained using global positioning and/or inertial measurement systems alone. The method is especially suitable in applications where multi-spectral data of a region of interest are obtained using sensing device that undergo a relative movement with respect to the region of interest, such as for example in case aerial imaging is performed or e.g. during industrial inspection of moving products. In case of aerial imaging, the method furthermore also is especially suitable for use in unmanned aerial vehicles (UAV), as the method can be performed using components low in weight, which is a major requirement if unmanned aerial vehicles are to be used or are to be used for a longer time. More particularly, the lower the weight to be carried, the lower the power consumption required and the longer flying times can be obtained with the unmanned aerial vehicles.

Figure 6:
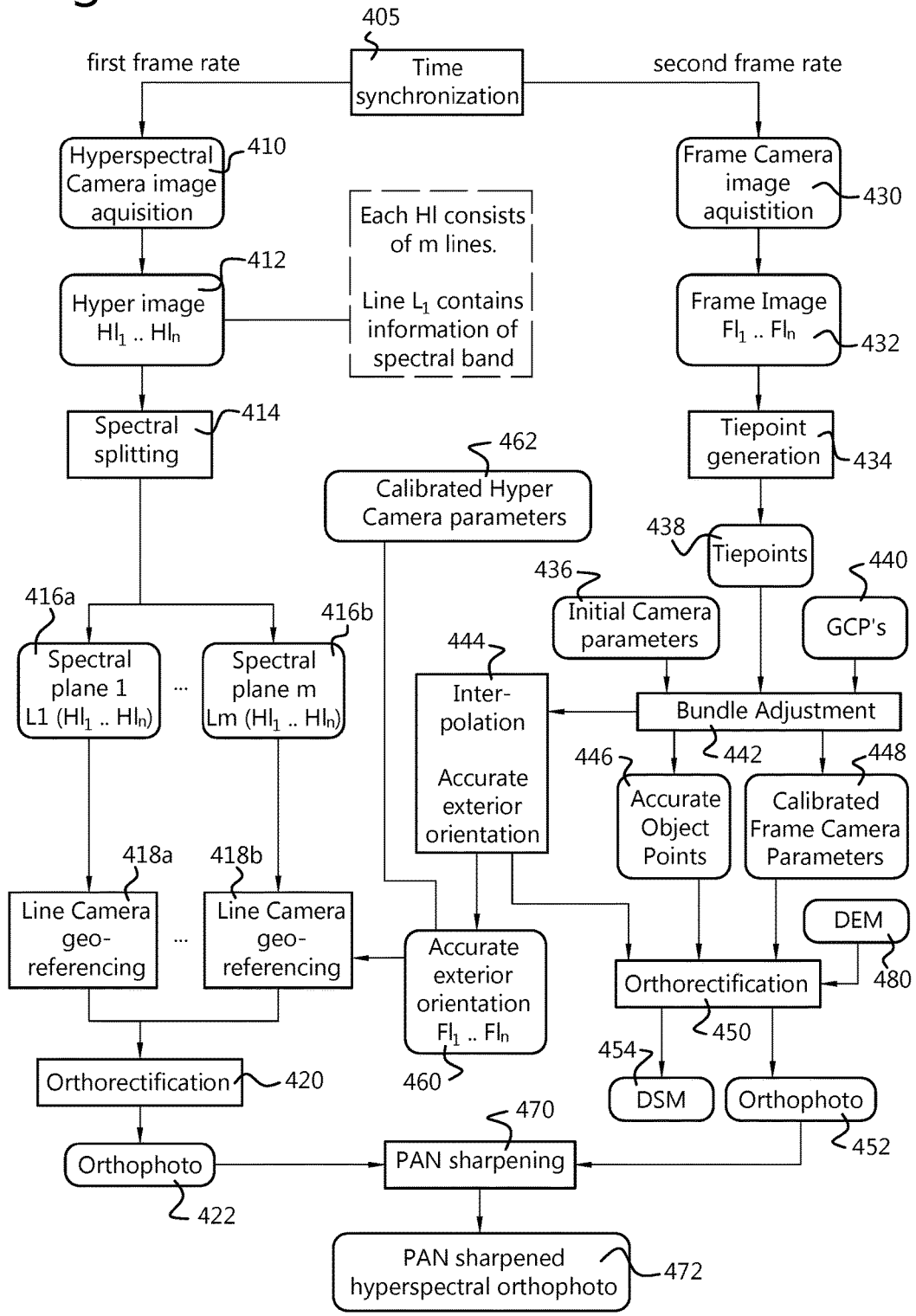
FIG. 6 represents a flow chart of an embodiment of the present invention.

In order to further illustrate standard and optional features of a method according to an embodiment of the present invention, FIG. 6 illustrates a detailed flow chart of an exemplary method for obtaining image data. The exemplary method thereby is adapted for capturing at least one two-dimensional image of the region of interest for deriving geometric referencing information, and for capturing hyperspectral images using a system as described above. More particularly, in the present example, the different hyperspectral images are obtained during relative movement of the region of interest with respect to the imaging system. The hyperspectral images are taken at a higher rate than the geometric reference images, which rates are preferably integer multiples and may be derived from a common synchronization block 405. Using one sensor, image acquisition for obtaining a two dimensional image of a region of interest is performed in step 430. Such image acquisition includes acquisition of a set of frame images $FI_1$, $FI_2$, ... $FI_n$, whereby n images are captured, as indicated in step 432. The images advantageously have a significant overlap so that geometric information, e.g. geographic information, on one image can be transferred to a subsequently or previously captured image and so that relative orientation changes can be detected. The overlap typically may be selected in the order of 60%, although embodiments of the present invention are not limited thereto. From the overlap of at least two images, tie points can be generated, as indicated in step 434. Such tie points are points occurring in the overlap of the images and thus allowing to determine a change in orientation of the instrument between acquisition of subsequent images. Furthermore, some ground control points may be available, providing geographical information indicating a geographical correlation between objects in the region of interest and their image in the two dimensional image, e.g. via GPS, via a list of previously recorded images, etc. The method may comprise a calibration step, wherein bundle adjustment is performed as indicated in 442, based on the generated tie points, indicated in 438, on global positioning coordinates, indicated in 440 and on initial camera parameters 436. This post processing step allows to obtain a more accurate exterior orientation, as indicated in 444, and which then can be used for obtaining corrected frame images having an accurate exterior orientation, as indicated in step 460. Optionally also accurate object points and frame camera parameters can be used. Accurate object points and accurate calibration frame camera parameters as well as standard Digital Elevation Model (DEM) products can be obtained as indicated in steps 446, 448, 480.

On the other hand, using another sensor, spectral camera image acquisition, e.g. hyper-spectral camera image acquisition is performed in step 410, resulting in a set of spectral images as indicated in step 412, whereby, in the present example each spectral image consists of a plurality of lines and each line contains information of a particular spectral band. As set out with reference to FIG. 3, the full spectral information regarding a region of interest for a given wavelength or in a given wavelength region is distributed over different, typically subsequently imaged, hyper-spectral images and using spectral splitting as indicated by 414, spectral plane information is obtained for the full region of interest as indicated in steps 416a, 416b. Using the geometric-referencing information obtained in step 460, geometric-referenced multi-spectral information can be obtained by coupling the geometric-referencing information including e.g. orientational information, to the spectral plane data, optionally including calibrated hyper-spectral camera parameters as indicated in 462. The latter results in geometric-referenced spectral information, as shown in 418a, 418b.

The aforementioned interpolation step takes place prior to the geometric-referencing 462, i.e. at the stage 444. The interpolation is schematically illustrated in the more detailed flow chart in FIG. 7.

Using the obtained data, an orthorectification of the images may be performed as indicated in steps 420 and 450 for the multi-spectral and conventional 2-dimensional image respectively, resulting in an orthophoto for both the multi-spectral and conventional 2-dimensional image, as indicated in steps 422 and 452 respectively. Orthorectification means terrain corrected geometric referencing of imagery using for example the sensor exterior orientation parameters, frame camera parameters (also referred to as interior orientation) and standard Digital Elevation Model (DEM) products. The result of this operation is an orthophoto. Combining these orthophoto images allows performing PAN sharpening of the multi-spectral data, as indicated in step 470, such that a PAN sharpened hyperspectral orthophoto can be obtained, as indicated in step 472. The orthorectification of the conventional 2-dimensional image may give rise to a digital surface model, as indicated in step 454.

The above schematic overview illustrates some standard and optional features and advantages according to embodiments of the present invention.

The inventors have further found that the performance of processing steps that rely on information from different spectral images can be improved by providing an optional preliminary renormalization step. This preliminary renormalization step may comprise dividing spectral images in identically arranged areas; for each of the areas, calculating a predetermined characteristic across said set of images; and, for each of the images, renormalizing intensity values in each of the areas in function of the predetermined characteristic of said area. For the said areas, one or more representative characteristics of the intensity values can be calculated. The average intensity value over the area is one such characteristic. Another useful characteristic is the standard deviation of the intensity values, which gives an indication of the contrast which will be measured. More generally, the distribution of the intensity values could be calculated and represented in a larger set of characteristics. The set of obtained characteristics per area can be used as normalization coefficients. After applying normalization using the characteristics, the values of those characteristics become uniform over different areas in in the resulting images.

The procedure to determine the normalization coefficients is carried out by averaging over a sufficiently large set of images, in order to average out the effect of the image content. Afterwards, the normalization can be carried out using the established coefficients, either on the same images, or on other images acquired in a similar way with the same instrument. This procedure simplifies the way of working as it is not necessary to calculate new coefficients for every new set of images.

The use of pre-processing is inter alia based on the insight of the inventors that there are two components to the difference in intensity of a given physical feature between different spectral images of the same acquisition series, which represent the physical feature in different wavelength bands: (1) the physical feature may have a different reflectivity in different wavelength bands and (2) the sensor may have a different sensitivity in different wavelength bands. The second factor can be compensated by renormalizing the various parts of the images relative to an average value that is representative for each respective part. While it is not possible to compensate for the first factor, the inventors have surprisingly found that the efficiency of registration algorithms and the like already greatly improves after compensating the second factor alone. The effect is believed to be due to the fact that real-world physical objects typically exhibit a slowly varying reflectivity in function of wavelength over a large part of the spectrum of interest.

The predetermined characteristic may be an average intensity, and the renormalizing may comprise renormalizing the intensity values in each of the areas relative to the average intensity value.

The areas may correspond to individual pixels. It is an advantage of this embodiment that the sensor is effectively calibrated on a per-pixel basis, such that variations in sensitivity of individual pixel-filter combinations can be accounted for, regardless of the source of such variations (including manufacturing tolerances or impurities in the filter). This leads to a maximal suppression of artefacts. By adding an optical system to the pixel-filter combinations, a complete imaging system is obtained. It can be chosen to include sensitivity variations caused by the optical system to correct for those, or to exclude them so that the system remains generic for different optical systems.

Alternatively, the areas may correspond to distinct wavelength bands. It is an advantage of this embodiment that the renormalization can be performed per block of pixels, wherein a block typically represents a rectangular strip of the sensor or a combination of multiple rectangular areas.

Where the examples of embodiments of the present invention mainly refer to geometric referencing for aerial photography, aerial imaging or satellite imaging, as indicated above, embodiments of the present invention are not limited thereto and may for example also be used for industrial inspection etc. In one example a sensing device can for example be used for inspecting goods on a conveyor belt, e.g. for detecting foreign materials between goods or for detecting deviating goods. Such foreign materials or deviating goods typically will show a spectral image deviating from the expected spectral image. The geometric referencing information may be a lateral position of objects or materials but also may be a height or relative height. Such a height or relative height of objects may for example be determined from the geometric referencing information based on the viewing angle of the geometric referencing sensor with respect to the object imaged. Deriving height information from image data based on a known sensor position and viewing angle with respect to the overall region of interest to be imaged is known by persons skilled in the art.

In one aspect, the present invention also relates to a processing system wherein the method for sensing or imaging or part of such method as described in embodiments of the previous aspects are implemented in a software based manner. Such a processing system may include at least one programmable processor coupled to a memory subsystem that includes at least one form of memory, e.g., RAM, ROM, and so forth. It is to be noted that the processor or processors may be a general purpose, or a special purpose processor, and may be for inclusion in a device, e.g., a chip that has other components that perform other functions. Thus, one or more aspects of embodiments of the present invention can be implemented in digital electronic circuitry, or in computer hardware, firmware, software, or in combinations of them. The processing system may include a storage subsystem that has at least one disk drive and/or CD-ROM drive and/or DVD drive. In some implementations, a display system, a keyboard, and a pointing device may be included as part of a user interface subsystem to provide for a user to manually input information. Ports for inputting and outputting data also may be included. More elements such as network connections, interfaces to various devices, and so forth, may be included. The various elements of the processing system may be coupled in various ways, including via a bus subsystem. The memory of the memory subsystem may at some time hold part or all of a set of instructions that when executed on the processing system implement the steps of the method embodiments described herein.

The present invention also includes a computer program product which provides the functionality of any of the methods according to the present invention when executed on a computing device. Such computer program product can be tangibly embodied in a carrier medium carrying machine-readable code for execution by a programmable processor. The present invention thus relates to a carrier medium carrying a computer program product that, when executed on computing means, provides instructions for executing any of the methods as described above. The term "carrier medium" refers to any medium that participates in providing instructions to a processor for execution. Such a medium may take many forms, including but not limited to, non-volatile media, and transmission media. Non volatile media includes, for example, optical or magnetic disks, such as a storage device which is part of mass storage. Common forms of computer readable media include, a CD-ROM, a DVD, a flexible disk or floppy disk, a tape, a memory chip or cartridge or any other medium from which a computer can read. Various forms of computer readable media may be involved in carrying one or more sequences of one or more instructions to a processor for execution. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fiber optics, including the wires that comprise a bus within a computer.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing the claimed invention. The foregoing description details certain embodiments of the invention. It will be appreciated, however, that no matter how detailed the foregoing appears in text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

While the invention has been described hereinabove with reference to specific embodiments, this was done to clarify and not to limit the invention. The skilled person will appreciate that various modifications and different combinations of disclosed features are possible without departing from the scope of the invention.

The invention claimed is:

1. A sensing device for obtaining geometric referenced multi-spectral image data of a region of interest in relative movement with respect to the sensing device, the sensing device comprising:
   at least a first two dimensional sensor element, the sensing device being adapted for obtaining subsequent multi-spectral images during said relative motion of the region of interest with respect to the sensing device thus providing distinct spectral information for different parts of a region of interest using the first sensor element;
   a second two dimensional sensor element, the sensing device being adapted for providing, using the second sensor element, an image of the region of interest for generating geometric referencing information to be coupled to the distinct spectral information;
   the first two dimensional sensor element being operable to capture a first sequence of frames at a first frame rate and the second two dimensional sensor element being operable to capture a second sequence of frames at a second frame rate;
   wherein the first frame rate is higher than the second frame rate;
   and wherein the sensing device further comprises a processor configured to generate intermediate geometric referencing information to be coupled to frames of said first sequence of frames for which no synchronous frame from said second sequence of frames is available, said intermediate geometric referencing information being derived from one or more temporally adjacent frames from said second sequence of frames.

2. The sensing device according to claim 1, wherein said second frame rate is selected to ensure a predetermined amount of overlap between respective regions imaged by consecutive frames of said second sequence of frames.

3. The sensing device according to claim 1, wherein a spectral filter and the first sensor element are arranged for obtaining spectral information at a first wavelength or wavelength range using a part of the first sensor element and for obtaining spectral information at a second wavelength or wavelength range using another part of the first sensor element.

4. The sensing device according to claim 1, wherein the first sensor element and second sensor element are integrated on the same substrate.

5. An imaging system comprising the sensing device according to claim 1.

6. An aerial vehicle comprising the imaging system according to claim 5.

7. A method for obtaining geometric referenced multi-spectral image data of a region of interest in relative movement with respect to a sensing device, the sensing device comprising:
   obtaining subsequent multi-spectral images during said relative motion of the region of interest with respect to the sensing device thus providing distinct spectral information for different parts of a region of interest using the first sensor element;

providing, using the second sensor element, an image of the region of interest for generating geometric referencing information to be coupled to the distinct spectral information;

the first two dimensional sensor element capturing a first sequence of frames at a first frame rate and the second two dimensional sensor element capturing a second sequence of frames at a second frame rate;

wherein the first frame rate is higher than the second frame rate;

and wherein the method further comprises generating intermediate geometric referencing information to be coupled to frames of said first sequence of frames for which no synchronous frame from said second sequence of frames is available, said intermediate geometric referencing information being derived from one or more temporally adjacent frames from said second sequence of frames.

8. A computer program product comprising code means configured to cause a processor to carry out the method according to claim 7.

* * * * *